No. 666,006. Patented Jan. 15, 1901.
G. F. FRALEY.
PHOTOGRAPHIC SHUTTER.
(Application filed Nov. 25, 1899.)
(No Model.) 2 Sheets—Sheet 1.
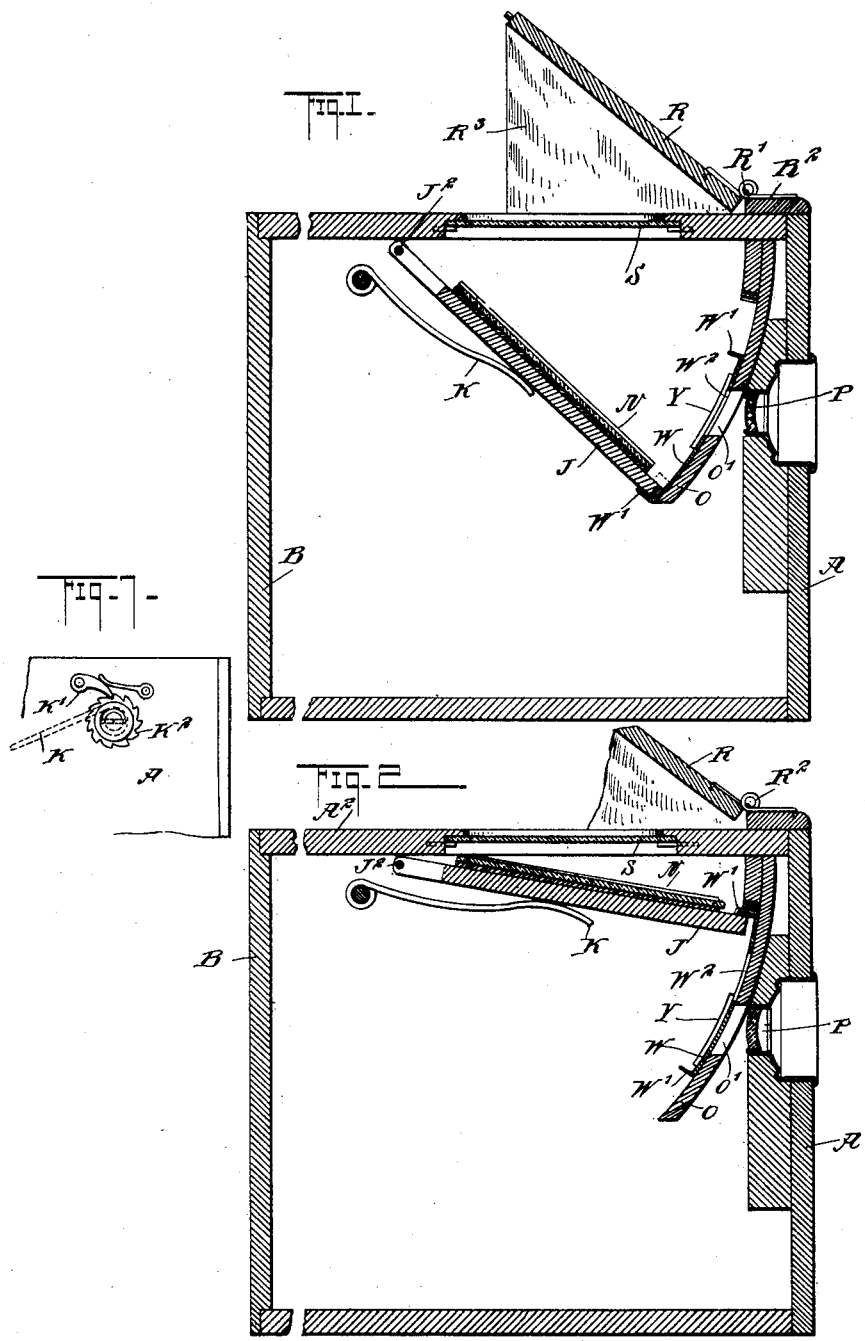
WITNESSES:
INVENTOR
Gassner F. Fraley
BY
ATTORNEYS No. 666,006. Patented Jan. 15, 1901.
G. F. FRALEY.
PHOTOGRAPHIC SHUTTER.
(Application filed Nov. 25, 1899.)
(No Model.) 2 Sheets—Sheet 2.
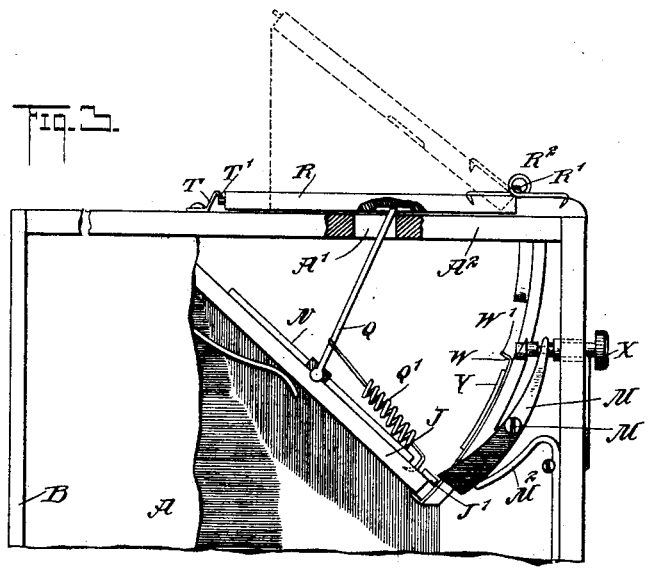
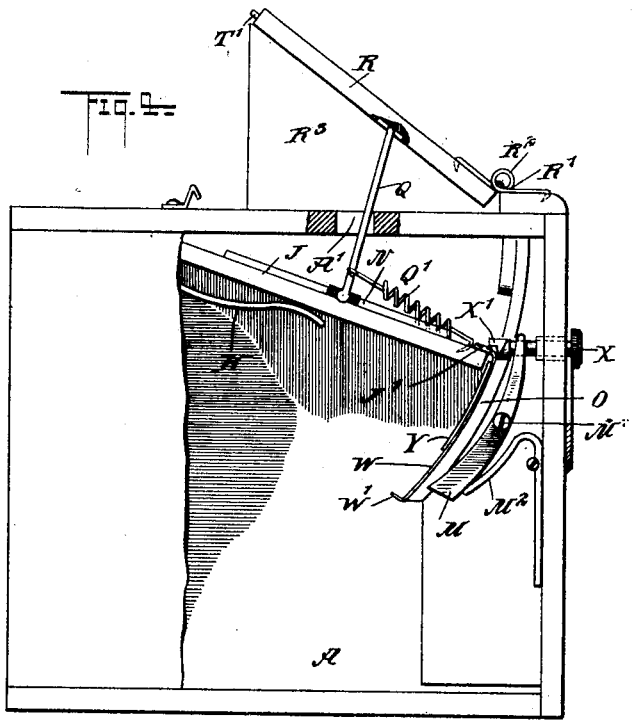
WITNESSES:
INVENTOR
Gassner F. Fraley
BY
ATTORNEYS

UNITED STATES PATENT OFFICE.

GASSNER FELTUS FRALEY, OF ST. LOUIS, MISSOURI, ASSIGNOR TO THE AUTOMATIC CAMERA COMPANY, OF NEW YORK, N. Y.

PHOTOGRAPHIC SHUTTER.

SPECIFICATION forming part of Letters Patent No. 666,006, dated January 15, 1901.

Application filed November 25, 1899. Serial No. 738,241. (No model.)

*To all whom it may concern:*

Be it known that I, GASSNER FELTUS FRALEY, a citizen of the United States, and a resident of St. Louis, in the State of Missouri, have invented a new and Improved Shutter and Finder Mechanism for Photographic Cameras, of which the following is a full, clear, and exact description.

My invention relates to photographic cameras, and has for its object to improve them in several respects, and particularly, first, to provide a finder showing the image of full size, as the image is produced by the same lens which effects the exposure; second, to utilize a portion of the finder for the operation of the shutter, and, third, to provide a simple mechanism for obtaining at will either snap-shots or time exposures.

The invention will be fully described hereinafter and the features of novelty pointed out in the claims.

Reference is to be had to the accompanying drawings, forming a part of this specification, in which similar characters of reference indicate corresponding parts in all the views.

Figure 1 is a central section or elevation of the camera through the axis of the objective, showing the parts in position before exposure. Fig. 2 is a similar view showing the parts in position after exposure. Fig. 3 is a broken view showing the upper portion of the camera and the shutter mechanism as the same would appear after removing one of the sides of the camera. Fig. 4 is a view of the entire camera with parts broken away and others in section as they would appear upon taking away one of the sides of the camera, the position of the parts being different from that shown in Fig. 3. Figs. 5 and 6 are detail views of the mechanism for changing the exposure from a snap-shot to a time exposure, and Fig. 7 is a detail of the mechanism for adjusting the speed of the shutter.

The camera consists of a box A, having a back B and any suitable mechanism (not shown) for holding the sensitive plate or film in the focal plane of the objective P. At the rear portion of the camera, near the top thereof, is pivoted an opaque plate J, having at its front end a lateral lug J'. This lug is adapted to be engaged by a locking-lever M, pivoted at M' and pressed by a spring $M^2$ to hold the plate J in its lowermost position.

The plate J is pivoted at $J^2$ and carries upon its upper face a mirror N, which is inclined at about forty-five degrees when said plate is in its lowermost position. In advance of the plate J a transverse segmental wall O extends from side to side within the camera, being stationary therein. The center of curvature of the said curved wall is at $J^2$. Immediately in the rear of the objective or lens P the wall O is provided with an aperture O', through which the light from the lens may reach either the mirror N or the sensitive plate, which is in the focal plane. With the plate J is connected at its side a link Q, extending upwardly through an opening A' in the top $A^2$ of the camera, and said link is adapted to be engaged by a hood R, pivoted to the top, as at R', and adapted to be swung into an open raised position by a coiled spring $R^2$. The sides $R^3$ of the hood may be made of cloth or other suitable flexible material.

Immediately beneath the hood a pane of ground glass S is located in the top of the camera to show the image reflected by the mirror N, as will be readily understood. When not in use, the hood R may be held closed by a catch T, engaging a pin T' on the hood.

Upon the segmental wall O is adapted to slide on the inside the shutter W. This shutter is also segmental and is provided at its upper and lower ends with flanges W', adapted to be engaged by the plate J. The shutter is guided at its edges in any suitable manner, such as by flanges Y on the wall O, and its downward movement is limited by the engagement of the upper flange W' with the upper ends of the flanges Y. The shutter has an aperture $W^2$ of approximately the same size as the aperture O' in the wall O. It will be understood that the shutter is operated by the movement of the plate J, which is under the control of the spring K. The speed of the shutter may be regulated by varying the tension of the spring K by means of a pawl K', engaging a ratchet $K^2$ on the shaft of the spring, or by means of any other suitable mechanism.

As hereinbefore stated, the plate J is held in its lower position by the lever M, and to release the plate J, I provide a button X, adapted to slide inward in the front of the camera, so as to swing the lever M on its fulcrum (see Fig. 4) and allow the plate J to be swung upward. To enable the apparatus to be set for time exposures or snap-shots, the button X is made at its inner end with a semicircular eccentric portion X'. By turning the button X on its axis the said eccentric portion may be brought into the path of the projection J' of the plate J, and if this is done the spring K will move the plate J halfway only, as shown in Fig. 4, the said plate being moved home fully after the operator releases the button X, so as to enable the same to move outward under the influence of the spring $M^2$. If, however, the button X is turned so as to bring the eccentric projection X' to one side and out of the path of the lug J', the spring K will swing the plate J fully up against the top of the camera, thus producing a snap-shot. The link Q may be connected with a spring Q' to keep it in a forward position; but this is not absolutely necessary.

The operation of the camera is as follows: Fig. 1 shows the position of the parts preparatory to making an exposure. The lens P throws the image through the openings O' and $W^2$ upon the mirror N, which reflects said image on the ground glass S, where it may be viewed by the operator. It will be observed that the image is of exactly the same size as the actual picture will be, being produced by the same lens. The parts of the shutter and of the releasing device are in the position illustrated by Fig. 3. To make an exposure, the operator presses the button X. This causes the lever M to swing on its pivot, so as to clear the lug J' of the plate J and allow the spring K to throw the plate J upward. In such movement the plate at first moves alone until it engages the upper flange W' of the shutter W. As the plate J swings past the aperture $W^2$ of the shutter it allows the light from the lens P to fall upon the sensitive plate, thus making an exposure; but in case the camera is set for a snap-shot the plate J will continue its upward movement, and owing to its contact with the upper flange W' of the shutter it will carry the shutter upward, so as to bring its lower imperforate portion over the opening O' of the wall O, thus shutting off the light from the camera, as shown in Fig. 2. When it is desired to make another exposure, the operator swings the hood R downward. This movement by the link Q causes a similar movement of the plate J, swinging the same back to its lowermost position, in which also the shutter is caused to move downward, so as to bring its aperture $W^2$ into registry with the opening O' in the wall O.

It will be seen that the finder shows the image full size, thus enabling the operator to better judge of the appearance of the finished picture than by the usual finders. If the button X is turned for a time exposure, the projection X' will engage the lug J', and thus stop the plate J before it has begun to move the shutter W out of its position of registry with the aperture O'. The lens will therefore act upon the sensitive plate until the operator releases the button X, when the plate J will complete its upward movement and close the shutter.

Having thus described my invention, I claim as new and desire to secure by Letters Patent—

1. In a camera, a curved wall or guide having an aperture, a curved shutter arranged to slide on said curved wall, a shutter-operating plate pivoted at the common center of curvature of the shutter and of said wall and arranged to have a limited movement independently of the shutter, and means for swinging said plate.

2. In a camera, a finder provided with a pivoted plate carrying a mirror, a stationary apertured wall located in the rear of the objective and curved with the pivot of the plate for its center of curvature, and a segmental shutter separate from the said plate and capable of remaining stationary during part of the plate's movement, said shutter being mounted to slide on said curved wall and provided with projections adapted to be engaged by the said plate to operate the shutter.

3. In a camera, a shutter having projections, a shutter-operating plate movable between said projections, a locking-lever adapted to hold the said plate, and a releasing-button adapted to actuate the lever, the said releasing-button being mounted to turn and carrying an eccentric portion which in one position projects into the path of the operating-plate to arrest the same, while in the other position the eccentric portion of the button will clear said plate.

4. In a camera, a curved apertured wall located in the rear of the objective, a segmental shutter mounted to slide on said wall, a pivoted operating-plate arranged to engage said shutter and capable of a limited independent movement, a finder-mirror carried by said plate, and a finder-hood connected with the operating-plate to move the latter inward upon the closing of the hood.

5. In a camera, a shutter, an operating-plate therefor, a finder-mirror carried by said plate, and a hood for the finder, connected with the operating-plate to move the latter inward upon the closing of the hood.

In testimony whereof I have signed my name to this specification in the presence of two subscribing witnesses.

GASSNER FELTUS FRALEY.

Witnesses:
WM. TANNER,
F. D. HIGH.